United States Patent
Ono et al.

(10) Patent No.: US 6,905,665 B2
(45) Date of Patent: Jun. 14, 2005

(54) METHOD FOR PURIFYING CARBON MONOXIDE

(75) Inventors: Hiroyuki Ono, Oyama (JP); Ryuichiro Isaki, Tsukuba (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/694,362

(22) Filed: Oct. 28, 2003

(65) Prior Publication Data

US 2004/0086447 A1 May 6, 2004

(30) Foreign Application Priority Data

Nov. 1, 2002 (JP) ........................................ 2002-319318

(51) Int. Cl.⁷ .............................. B01J 8/00; B01J 8/02; B01D 47/00; C01B 31/18
(52) U.S. Cl. .................... 423/247; 423/210; 423/213.2; 423/418.2
(58) Field of Search ............................... 423/418.2, 210, 423/213.2, 247

(56) References Cited

FOREIGN PATENT DOCUMENTS

| GB | 1369047 | * 10/1974 |
| WO | WO 99/22848 | 5/1999 |

* cited by examiner

*Primary Examiner*—J. Parsa
(74) *Attorney, Agent, or Firm*—Nixon & Vanderhye P.C.

(57) ABSTRACT

A method for purifying carbon monoxide, which can efficiently remove metal carbonyl in carbon monoxide while suppressing the production of carbon dioxide, is provided by selecting a metal oxide having proper oxidizability as a reactant with metal carbonyl. Carbon monoxide containing metal carbonyls as trace impurities is contacted with a remover containing manganese sesquioxide as a main component, thereby reacting metal carbonyl in carbon monoxide with said manganese sesquioxide to remove said metal carbonyl from said carbon monoxide.

8 Claims, 1 Drawing Sheet

METHOD FOR PURIFYING CARBON MONOXIDE

BACKGROUND OF THE INVENTION

1. Field of the Invention

The present invention relates to methods for purifying carbon monoxide and, more particularly, relates to a method for purifying carbon monoxide by removing metal carbonyls in high-purity carbon monoxide, which is used in an etching process in the semiconductor industry.

2. Description of Related Art

Because of high reactivity with metals, carbon monoxide produces various metal carbonyls on contact with various metals, and also on contact with metal constituting a cylinder charged with carbon monoxide or piping through which carbon monoxide flows; for example, contact with stainless steel produces metal carbonyls such as nickel carbonyl. Therefore, when using high-purity carbon monoxide in the semiconductor industry, a means of removing metal carbonyl from carbon monoxide must be provided at a point of use so as to reliably remove metal carbonyls which may be produced in the piping.

As a means of removing metal carbonyls in carbon monoxide, various methods have been proposed. Among these methods, a method of removing metal carbonyl by using a metal oxide having strong oxidizability such as copper oxide is known (see, for example, Patent Document 1).

Patent Document 1: Published Japanese Patent Translation No. 2001-521813 of the PCT Application (pages 2 to 3)

However, when conventionally used oxides, that is, metal oxides having strong oxidizability, such as copper oxide, manganese dioxide, and chromium oxide are used to remove metal carbonyls in carbon monoxide, the carbon monoxide itself tends to be oxidized, producing a large amount of carbon dioxide. When carbon monoxide containing a large amount of carbon dioxide is used in the etching process, there is a possibility that abnormal charge of the plasma and abnormal processing in the etching will occur.

According to a conventional treatment for removal of metal carbonyl, it has been believed that carbon dioxide as a reaction by-product may be removed by an adsorbent in a later stage, although particular attention was paid only to reactions such as oxidative decomposition of metal carbonyl. A large amount of carbon dioxide produced drastically increases the amount of the adsorbent in the later stage and requires replacement operations and regenerating operations, thus adversely affecting costs in the semiconductor industry.

BRIEF SUMMARY OF THE INVENTION

An object of the present invention is to provide a method for purifying carbon monoxide, which can efficiently remove metal carbonyl in carbon monoxide while suppressing the production of carbon dioxide, by selecting a metal oxide having proper oxidizability as a reactant with metal carbonyl.

DETAILED DESCRIPTION OF THE INVENTION

Figure 1:
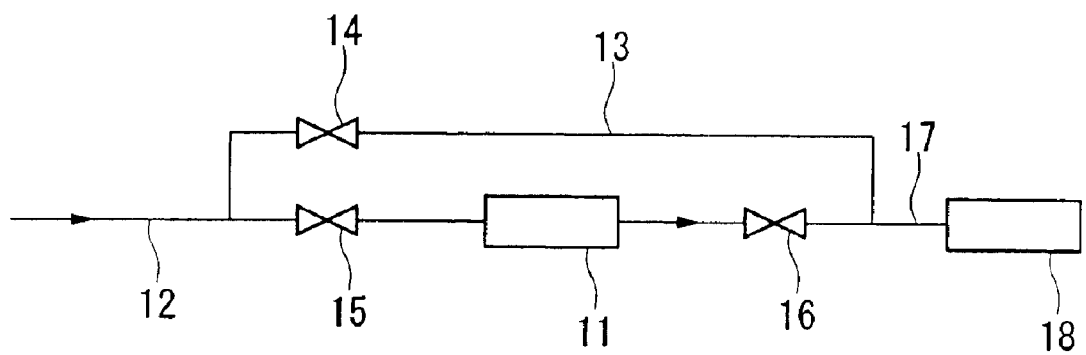
FIG. 1 is a schematic chart showing a test apparatus used in examples.

To achieve the objects described above, a method for purifying carbon monoxide of the present invention comprises contacting carbon monoxide with a remover containing manganese sesquioxide as a main component, thereby reacting metal carbonyl in carbon monoxide with said manganese sesquioxide to remove said metal carbonyl from said carbon monoxide.

In the present invention, an oxidizing agent (remover) used to remove metal carbonyl present in carbon monoxide contains manganese sesquioxide having proper oxidizability as a main component in place of a conventional metal oxide having strong oxidizability. When using a metal oxide having strong oxidizability to oxidize metal carbonyl in carbon, the reaction with metal carbonyl arises and, at the same time, carbon monoxide reacts with metal oxide and also the side reaction of producing carbon dioxide proceeds.

As described below, a comparison in reaction is made between the case where manganese dioxide ($MnO_2$), which is conventionally used tetravalent manganese oxide, is used as an oxide of manganese so as to remove nickel carbonyl from carbon monoxide as an example of metal carbonyl and the case where manganese sesquioxide ($Mn_2O_3$), which is trivalent manganese oxide used in the present invention, is used. This comparison is made on the assumption that nickel carbonyl produces stable nickel oxide (NiO) as a result of oxidative decomposition.

First, when using manganese dioxide, there is a possibility that the reactions shown in Table 1 occur between nickel carbonyl and manganese dioxide. Furthermore, since the carbon monoxide itself is a relatively strong reducing agent, there is a possibility that manganese dioxide as an oxidizing agent will react with carbon monoxide, as shown in Table 1. In Table 1, calculated values of production enthalpy ($\Delta H$ [KJ/mol]) in the respective reactions are shown.

TABLE 1

| | | |
|---|---|---|
| (1) $Ni(CO)_4 + 2MnO_2$ | $\rightarrow NiO + Mn_2O_3 + 4CO$ | $\Delta H = -2.5$ |
| (2) $Ni(CO)_4 + 10MnO_2$ | $\rightarrow NiO + 5Mn_2O_3 + 4CO_2$ | $\Delta H = -810.2$ |
| (3) $Ni(CO)_4 + MnO_2$ | $\rightarrow NiO + MnO + 4CO$ | $\Delta H = +51.3$ |
| (4) $Ni(CO)_4 + 5MnO_2$ | $\rightarrow NiO + 5MnO + 4CO_2$ | $\Delta H = -490.2$ |
| (5) $Ni(CO)_4 + 1/2MnO_2$ | $\rightarrow NiO + 1/2Mn + 4CO$ | $\Delta H = +176.5$ |
| (6) $Ni(CO)_4 + 5/2MnO_2$ | $\rightarrow NiO + 5/2Mn + 4CO_2$ | $\Delta H = +84.6$ |
| (7) $CO + 2MnO_2$ | $\rightarrow Mn_2O_3 + CO_2$ | $\Delta H = -201.9$ |
| (8) $CO + MnO_2$ | $\rightarrow MnO + CO_2$ | $\Delta H = -148.2$ |
| (9) $CO + 1/2MnO_2$ | $\rightarrow 1/2Mn + CO_2$ | $\Delta H = -23.0$ |

When using manganese sesquioxide, there is a possibility that the reactions shown in Table 2 will occur between nickel carbonyl and carbon monoxide. Similar to the case described above, calculated values of production enthalpy ($\Delta H$ [KJ/mol]) in the respective reactions are shown in Table 2.

TABLE 2

| | | |
|---|---|---|
| (11) $Ni(CO)_4 + Mn_2O_3$ | $\rightarrow NiO + 2MnO + 4CO$ | $\Delta H = +105.0$ |
| (12) $Ni(CO)_4 + 5Mn_2O_3$ | $\rightarrow NiO + 10MnO + 4CO_2$ | $\Delta H = -272.7$ |
| (13) $Ni(CO)_4 + 1/3Mn_2O_3$ | $\rightarrow NiO + 2/3Mn + 4CO$ | $\Delta H = +619.0$ |
| (14) $Ni(CO)_4 + 5/3Mn_2O_3$ | $\rightarrow NiO + 10/3MnO + 4CO_2$ | $\Delta H = +382.8$ |
| (15) $CO + Mn_2O_3$ | $\rightarrow 2MnO + CO_2$ | $\Delta H = -94.9$ |
| (16) $CO + 1/3Mn_2O_3$ | $\rightarrow 2/3Mn + CO_2$ | $\Delta H = +35.7$ |

In Table 1 and Table 2, the reaction wherein the production enthalpy $\Delta H$ exhibits a positive value occurs with difficulty, and the larger the negative value, the more the reaction proceeds. Therefore, it can be said that nickel carbonyl can be decomposed more effectively by using manganese dioxide as compared with the case of using manganese sesquioxide in view of oxidative decomposition of nickel carbonyl. Since manganese dioxide has high reactivity with carbon monoxide as a base gas, when manganese dioxide is used in a treatment for removal of nickel carbonyl, the amount of carbon dioxide after the removal treatment is larger than that in the case of using manganese sesquioxide.

Consequently, it was found that the oxidative decomposition of nickel carbonyl can be carried out while suppressing the production of carbon dioxide by using manganese sesquioxide as an oxidizing agent for removing nickel carbonyl instead of manganese dioxide. Since the use of manganese sesquioxide makes it possible to suppress the reaction between the remover (oxidizing agent) and carbon monoxide and to reduce the amount of the carbon dioxide to be produced, a treatment for removal of carbon dioxide can be easily carried out in the later stage. Also, utilization of carbon monoxide is slightly improved.

Contact of the carbon monoxide and the remover for removal of metal carbonyl can be carried out by passing carbon monoxide through a vessel (reaction pipe) charged with the remover. The pressure and temperature are not specifically limited and carbon monoxide may be contacted with the remover by introducing into the reaction pipe under common conditions of pressure and temperature in case of using carbon monoxide. Also the flow rate of carbon monoxide is not specifically limited and common conditions in this kind of a treatment can be employed.

The reaction between manganese sesquioxide and metal carbonyl can be promoted by adding a small amount of a noble metal such as gold, silver, platinum, mercury, palladium or cerium, particularly silver to a remover containing manganese sesquioxide as a main component. These noble metals may be added in the form of single metal, or they can be used alone or in combination in the form of a metal compound which exerts no influence on the treatment for removal of nickel carbonyl.

The addition of a noble metal, for example, silver, to the remover can be carried out by forming a mixed powder of manganese sesquioxide and a proper amount of silver nitrate into particles of about 0.5 mm in diameter using a tablet machine and heating the particles to about a temperature within a range from 120 to 200° C., preferably 150° C., thereby decomposing silver nitrate to remove nitrogen oxide.

Furthermore, a remover containing manganese sesquioxide as a main component can also be used in the state where powders or particles thereof are supported on a carrier such as activated carbon, alumina, or zeolite. Since supporting on the carrier makes it possible to increase the surface area effective to the reaction and to improve the reaction efficiency, the amount of metal carbonyl to be removed per dosage unit can be increased.

By contacting carbon monoxide, which was contacted with the remover, with a porous material such as alumina, zeolite, or activated carbon, carbon dioxide produced by the reaction between the carbon monoxide and the remover can be adsorbed to the porous material to remove it from carbon monoxide. Also, in the case in which the carbon monoxide contains impurities such as moisture, impurities can be removed from the carbon monoxide by adsorbing to the porous material. In the present invention, since the amount of carbon dioxide produced in the treatment for removal of metal carbonyl decreases as compared with the prior art, carbon dioxide can be accurately removed by using a small amount of the porous material, and thus the cost required for the treatment for removal of carbon dioxide can be remarkably reduced as compared with the prior art.

Contact between the carbon monoxide after subjecting to the treatment for removal of metal carbonyl and the porous material may be carried out by providing an adsorption pipe charged with the porous material in the later stage of the reaction pipe charged with the remover, or packing one pipe (vessel) with the remover at the upstream side and the porous material at the downstream side, or packing one pipe with the remover and the porous material in an appropriately mixed state and simultaneously performing removal of metal carbonyl in carbon monoxide and removal of carbon dioxide produced.

As described above, when the pipe is charged with the remover, the remover (including the remover alone and the remover supported on the carrier) and the porous material are preferably formed into particles in size of about 0.1 to 5 mm taking account of gas flow and removal efficiency, and treatment of foreign matter such as particles.

Since the remover and the porous material (hereinafter sometimes referred to as a remover) are in the state of adsorbing various impurities such as moisture and carbon dioxide immediately after preparation, an activation treatment for removing adsorbed impurities by a release process must be carried out before use in a treatment for removal of metal carbonyl and a treatment for removal of carbon dioxide. This activation treatment can be carried out by purging using an inert gas such as nitrogen, argon or helium, purified by reducing the concentration of various impurities to 1 ppm by volume or lower, preferably 1 ppb by volume or lower, in the state where the remover is heated to a temperature within a range from 100 to 500° C., preferably from 250 to 350° C.

After subjecting a proper amount of the remover to the activation treatment, a required amount of the remover may be used to pack the reaction pipe after the treatment. It is preferable that a required amount of the remover be subjected to the activation treatment in the state of being charged in the reaction pipe and the remover after being subjected to the treatment is used in the treatment for removal of metal carbonyl and carbon dioxide so as not to be exposed to impurities such as air.

The flow rate of the purge gas and the purge time in the activation treatment vary depending on not only the heating temperature, but also the capacity of the reaction pipe charged with the remover. Commonly, the amount of impurities adsorbed to the remover can be reduced to a trace amount by treating under atmospheric pressure or higher and pressure of lower than 1 MPa at a flow rate of 1 L/min or more for at least one hour, preferably at least 24 hours.

The vessel, such as a reaction pipe, to be charged with the remover or porous material is preferably made of a material having satisfactory heat resistance, pressure resistance and corrosion resistance, for example, aluminum, copper, stainless steel, and brass. When using a vessel made of a material having high reactivity with carbon monoxide, for example, nickel, chromium or iron, the vessel is preferably subjected to a surface treatment such as coating of the surface contacted with carbon monoxide with an oxide film so that the active metal surface is not exposed to carbon monoxide. Also, the production of metal carbonyl can be prevented by coating the inner surface of the vessel with glass.

The heating temperature and the pressure in the above-mentioned activation treatment are sometimes limited according to the material of the vessel. For example, when using an aluminum vessel, the heating temperature is preferably set to 300° C. or lower. In the case of setting the heating temperature to lower temperature, the processing time is preferably extended to 10 hours or longer, and preferably 30 hours or longer. When using a glass-coated vessel, the flow pressure of the inert gas is preferably set to 0.5 MPa or lower.

EXAMPLES

The following examples further illustrate the present invention in detail.

Example 1

As a reaction pipe, a stainless steel pipe having an inner diameter of 4 mm and a length of 100 mm (inner capacity: 1.5 cc) subjected to a bright annealing (BA) treatment was used. The reaction pipe was charged with manganese sesquioxide having a particle size of 1 mm and an activation treatment was carried out first. The activation treatment was carried out by passing a purified nitrogen gas as a purge gas, which is prepared by reducing the concentration of each of the impurities such as oxygen, moisture, carbon dioxide, and methane to 1 ppb by volume or lower, through the reaction pipe in a state of being heated to 350° C. under the conditions of 0.1 MPa and 1 L/min for 24 hours. After the completion of the activation treatment, the reaction pipe was stored after closing valves provided at both ends of the reaction pipe so that the manganese sesquioxide was not exposed to an air.

As shown in a schematic chart shown in FIG. 1, a reaction pipe 11, after being subjected to the activation treatment, was connected to each line and a mixed gas prepared by adding 600 ppm by volume of nickel carbonyl to carbon monoxide was introduced through a test gas inflow line 12 under the conditions of 0.1 MPa and 2 L/min. A bypass valve 14 of a bypass line 13 was closed and an inflow valve 15 and an outflow valve 16 provided at both ends of the reaction pipe were opened, and then the concentration of nickel carbonyl in a gas discharged through a reaction pipe 11 was measured by a Fourier transform infrared spectrometer (Fr-IR) 18 connected to a test gas outflow tube 17. The concentration of nickel carbonyl in the mixed gas used as the test gas was confirmed by previously introducing the mixed gas into the Fourier transform infrared spectrometer 18 through the bypass line 13.

Figure 2:
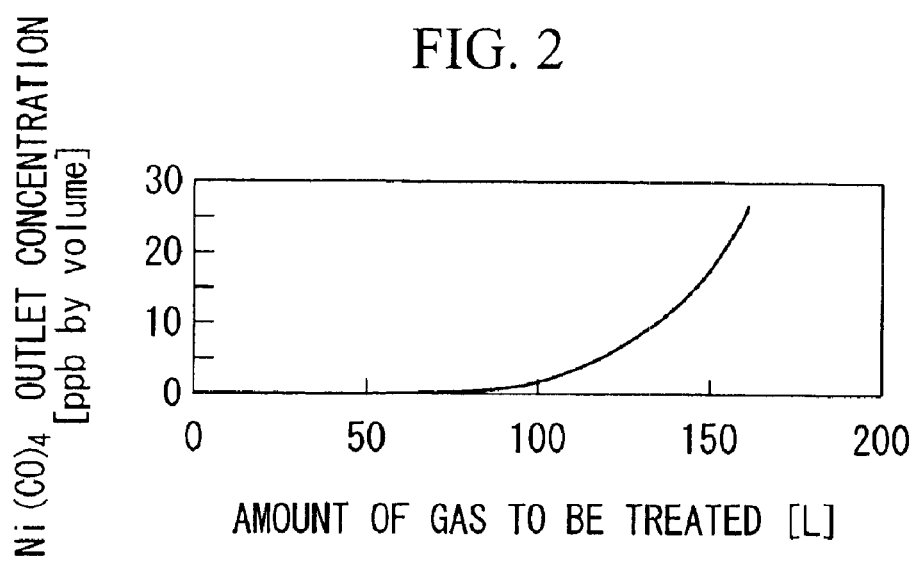
FIG. 2 is a graph showing a relation between the amount of a gas to be treated and the $Ni(CO)_4$ outlet concentration in example 1.

A relationship between the mixed gas inflow amount (amount of gas to be treated) and the concentration of nickel carbonyl ($Ni(CO)_4$ outlet concentration) in the reaction pipe effluent gas during continuous treatment for removal of nickel carbonyl through the reaction pipe 11 is shown in FIG. 2. After the initiation of the removal treatment, nickel carbonyl was not detected in the reaction pipe effluent gas for a while (lower than 0.1 ppb by volume). In the case in which the point of time, where the concentration of nickel carbonyl in the reaction pipe effluent gas increased to 1 ppb by volume, is defined as breakthrough, the amount of nickel carbonyl to be treated in the remover used in this example was 0.06 cc per 1 g of a reactant (manganese sesquioxide). It was also confirmed that the reaction pipe effluent gas contains no moisture.

Then, a purified carbon monoxide gas prepared by previously removing nickel carbonyl was passed through a reaction pipe through which the mixed gas had been passed in a total amount of 160 L, and the concentration of nickel carbonyl in the reaction pipe effluent gas was measured. As a result, nickel carbonyl was not detected in the reaction pipe effluent gas (purified carbon monoxide gas). It was confirmed that nickel carbonyl was not released from the reaction pipe having been subjected to the treatment for removal of nickel carbonyl.

Example 2

The same test as in example 1 was carried out, except that an adsorption pipe charged with 0.5 cc of activated alumina was connected to the downstream side of the reaction pipe in example 1. As a result, the concentration of carbon dioxide in the reaction pipe effluent gas was lower than the detectable limit (lower than 0.5 ppm by volume).

Comparative Example 1

Under the same conditions as in example 2, except that manganese sesquioxide as the remover was replaced by copper oxide, a test of removing nickel carbonyl in carbon monoxide by using copper oxide and removing carbon dioxide produced after the removal treatment by using activated alumina was carried out. After the initiation of the test, the concentration of nickel carbonyl in the reaction pipe effluent gas discharged through the reaction pipe via the adsorption pipe was 0.1 ppm by volume or lower and was almost the same as that of examples 1 and 2, while the concentration of carbon dioxide was 2 ppm by volume. When the amount of the gas to be treated exceeds 15 L by a continuous treatment, the concentration of carbon dioxide further increased. At this point in time, the concentration of nickel carbonyl scarcely changed.

It was found that, since the amount of the activated alumina required to remove carbon dioxide was the same as that in example 2, carbon dioxide was produced by the side reaction in the reaction pipe in an amount larger than that of carbon dioxide produced by the reaction between copper oxide and nickel carbonyl; that is, carbon monoxide as a base gas reacted with copper oxide to produce a large amount of carbon dioxide. Also, it was judged that breakthrough of the activated alumina occurred when the amount of the gas to be treated exceeded 15 L and the concentration of carbon dioxide increased.

Comparative Example 2

Under the same conditions as in example 2 and Comparative example 1, except that manganese dioxide was used as the remover, a treatment for removal of nickel carbonyl and a treatment for removal of carbon dioxide were carried out. As a result, the concentration of carbon dioxide in the reaction pipe effluent gas until the amount of the gas to be treated of 17 L was 1.8 ppm by volume and increased thereafter. It was found that a large amount of carbon dioxide was also produced by the reaction between manganese dioxide and carbon monoxide in this example, similar to Comparative example 1.

Example 3

In the same manner as in example 1, except for purging an air in the reaction pipe without performing an activation treatment of the remover (manganese sesquioxide), a treatment for removal of nickel carbonyl was carried out. That is, the above-mentioned purified nitrogen gas was passed through the same reaction pipe charged with manganese sesquioxide as in example 1 under the conditions of 0.1 MPa and 1 L/min for 5 minutes and, after purging an air in the reaction pipe, the mixed gas was introduced under the same conditions as in example 1. As a result, the concentration of nickel carbonyl in the reaction pipe effluent gas was 0.1 ppm by volume or lower until the amount of the gas to be treated was 18 L, and then the concentration of nickel carbonyl increased because breakthrough of the remover occurred. The concentration of carbon dioxide in the reaction pipe effluent gas was 0.6 ppm by volume.

Example 4

A remover containing 2% by weight of silver was prepared by forming a mixed powder of manganese sesquioxide and silver nitrate into particles in size of about 0.5 mm using a tablet machine and heating the particles to about 150° C., thereby to decompose silver nitrate. Using the resulting remover, nickel carbonyl in carbon monoxide was removed and carbon dioxide produced by the removal treatment was removed by using activated alumina under the same conditions as in example 2. As a result, the amount of nickel carbonyl to be treated in the remover used in this example was 0.08 cc per 1 g of the reactant (manganese sesquioxide). The concentration of carbon dioxide in the reaction pipe effluent gas was lower than the detectable limit (lower than 0.5 ppm by volume).

Example 5

A remover was prepared by supporting manganese sesquioxide on a carrier composed of spherical activated alumina particles having a particle size of 1 mm. Using the resulting remover, nickel carbonyl in carbon monoxide was removed and carbon dioxide produced by the removal treatment was removed by using activated alumina under the same conditions as in example 2. As a result, the amount of nickel carbonyl to be treated in the remover used in this example was 0.07 cc per 1 g of the reactant (manganese sesquioxide). The concentration of carbon dioxide in the reaction pipe effluent gas was lower than the detectable limit (lower than 0.5 ppm by volume).

According to the method for purifying carbon monoxide of the present invention, a treatment for removal of metal carbonyl can be accurately carried out while suppressing the production of carbon dioxide as a reaction by-product and thus removal of carbon dioxide in the later stage can be carried out easily and accurately. Consequently, the cost required for the treatment for removal of carbon dioxide can be reduced and yield of a device in the etching process using purified carbon monoxide can be improved.

What is claimed is:

1. A method for purifying carbon monoxide, comprising the steps of:
    contacting carbon monoxide gas containing a metal carbonyl with a remover containing manganese sesquioxide as a main component, thereby reacting the metal carbonyl in the carbon monoxide gas with said manganese sesquioxide to remove said metal carbonyl from said carbon monoxide gas.

2. The method for purifying carbon monoxide according to claim 1, wherein said remover contains a noble metal.

3. The method for purifying carbon monoxide according to claim 1, wherein said remover is in a state where fine particles are supported on a carrier.

4. The method for purifying carbon monoxide according to claim 1, comprising the further step of:
    contacting the carbon monoxide gas with a porous material, after the carbon monoxide gas is contacted with the remover.

5. The method for purifying carbon monoxide according to claim 1, further comprising the step of:
    activating the remover to release impurities from the remover, before the carbon monoxide gas is contacted with the remover.

6. The method for purifying carbon monoxide according to claim 5, wherein the activation treatment is carried out by purging an inert gas while heating the remover, the inert gas is purified by reducing concentration of impurities to 1 ppm by volume or lower.

7. The method for purifying carbon monoxide according to claim 6, wherein the remover is heated to a temperature within a range from 100 to 500° C. in the activation treatment.

8. The method for purifying carbon monoxide according to claim 6, wherein the impurities are selected from the group consisting of oxygen, moisture, carbon dioxide, and methane.

* * * * *